(12) United States Patent
Rovellini (10) Patent No.: US 10,173,854 B2
(45) Date of Patent: Jan. 8, 2019

(54) SUPPORT ELEMENT FOR A FEED ROLLER AND ADVANCEMENT MEMBER FOR A FIBER MATERIAL, CARBONIZATION LINE TO PRODUCE CARBON FIBERS AND METHOD FOR ADJUSTING INCLINATION OF THE FEED ROLLER

(71) Applicant: M.A.E. S.P.A., Piacenza (PC) (IT)

(72) Inventor: Marco Rovellini, Piacenza (IT)

(73) Assignee: M.A.E. S.P.A., Piacenza (IT)

( * ) Notice: Subject to any disclaimer, the term of this patent is extended or adjusted under 35 U.S.C. 154(b) by 122 days.

(21) Appl. No.: 15/297,636

(22) Filed: Oct. 19, 2016

(65) Prior Publication Data

US 2017/0107645 A1 Apr. 20, 2017

(30) Foreign Application Priority Data

Oct. 20, 2015 (IT) .................. 102015000063352

(51) Int. Cl.
*B65H 23/26* (2006.01)
*B65H 23/32* (2006.01)
(Continued)

(52) U.S. Cl.
CPC ............ *B65H 23/26* (2013.01); *B65H 23/32* (2013.01); *F16C 13/02* (2013.01); *F16C 23/00* (2013.01);
(Continued)

(58) Field of Classification Search
CPC ......... B65H 23/26; B65H 23/32; F16C 13/02; F16C 23/00; F16C 35/047
(Continued)

(56) References Cited

U.S. PATENT DOCUMENTS 3,552,923 A * 1/1971 Carpenter et al. ........ D01F 9/14
264/DIG. 19
5,571,327 A * 11/1996 Ookouchi ............... C23C 2/003
118/423
(Continued)

FOREIGN PATENT DOCUMENTS

CH 680594 A5 9/1992
DE 19927897 A1 12/2000
(Continued)

OTHER PUBLICATIONS

Italian Search Report dated Jun. 30, 2016 for counterpart Italian Application No. IT UB20155071.

*Primary Examiner* — Huy Tram Nguyen
(74) *Attorney, Agent, or Firm* — Shuttleworth & Ingersoll, PLC; Timothy Klima (57) ABSTRACT

A support element for a feed roller for a fibre material, preferably a precursor fibre, to be used in an oxidation or carbonization line for producing carbon fibres, including a base provided with means for attachment to a structure or frame of the oven, a support ring coupled with the base and having at least one passing-through opening for receiving one end of the feed roller, and adjustment means operatively interposed between the base and the ring, and configured to move the position of the ring with respect to the base along at least one adjustment direction, transverse to a central axis of the opening, in order to adjust the position of the ring as a function of the deformations of the roller.

14 Claims, 8 Drawing Sheets

(51) Int. Cl.
  *F16C 23/00*  (2006.01)
  *F16C 35/04*  (2006.01)
  *F16C 13/02*  (2006.01)
  *D01F 9/32*   (2006.01)
  *F16C 33/78*  (2006.01)
  *F16C 33/72*  (2006.01)

(52) U.S. Cl.
  CPC .............. *F16C 35/047* (2013.01); *D01F 9/32* (2013.01); *F16C 33/723* (2013.01); *F16C 33/7886* (2013.01); *F16C 2340/00* (2013.01)

(58) Field of Classification Search
  USPC ....................................................... 422/198
  See application file for complete search history.

(56) References Cited

U.S. PATENT DOCUMENTS

| | | | |
|---|---|---|---|
| 6,776,611 B1 * | 8/2004 | Sprague .................... | D01F 9/32 |
| | | | 432/242 |
| 8,146,397 B2 * | 4/2012 | Penttilä ................. | B65H 18/02 |
| | | | 100/169 |
| 2007/0007709 A1 * | 1/2007 | Miyazaki ................. | B65H 1/14 |
| | | | 271/113 |

FOREIGN PATENT DOCUMENTS

| | | |
|---|---|---|
| DE | 102005045987 A1 | 4/2007 |
| EP | 0555836 A2 | 8/1993 |
| EP | 2006227 A2 | 12/2008 |
| GB | 2068482 A | 8/1981 |

\* cited by examiner

SUPPORT ELEMENT FOR A FEED ROLLER AND ADVANCEMENT MEMBER FOR A FIBER MATERIAL, CARBONIZATION LINE TO PRODUCE CARBON FIBERS AND METHOD FOR ADJUSTING INCLINATION OF THE FEED ROLLER

This application claims priority to Italian Patent Application 102015000063352 filed Oct. 20, 2015, the entirety of which is incorporated by reference herein.

DESCRIPTION

The present invention finds particular application in the treatment of polymers and, preferably, in the carbon fibre production from a precursor fibre.

Note that the presence of carbon fibre, as well as the opportunity to treat it, has led to an exponential growth in the use of such composites in many applications, for example in the energy industry, in transports, in the production of sports equipment, and also in aviation industry.

Currently the carbon fibres are produced per modification of artificial fibres (industrially rayon, experimentally lignin), synthetic fibres (polyacrylonitrile, but also PBO and, experimentally, other thermoplastic fibres), or residues of distillation of oil or tar (pitch). The first carbon fibres are traditionally referred to as carbon fibres derived from PAN, while the second carbon fibres carbon fibres derived from pitch. Often, the latter type of fibres is improperly referred to as "graphite fibres", although obviously these fibres are not obtained from graphite, to emphasize the fact that when said fibres are subjected to a thermal treatment above 2000° C., they finally have an arrangement of the carbon atoms very similar to the typical arrangement of the graphite and a substantial absence of other elements in the lattice.

Operationally, the carbon fibre production begins with the thermal treatment of a "precursor" or "proto-filament", i.e., the departure fibre that, after a precise sequence of thermal treatments, is transformed into the final product.

The precursor which has begun the era of high-performance carbon fibres was the polyacrylonitrile fibre (PAN) characterized by an adequate chemical composition, a particular molecular orientation, and a certain morphology. The chemical composition is important to moderate the exothermicity of the cyclization reaction, which is carried out between 220 and 260° C. for some hours in the presence of air.

By increasing the temperature for a predetermined time interval, again in the presence of air, the oxidation process takes place, during which the bonds between carbon and hydrogen are broken. As a result, the previously formed rings become aromatic and the process releases gaseous hydrogen. The oxidation reaction leads to a black-coloured fireproof material, the so-called oxidized PAN, but with poor mechanical properties, which is used for protective clothing, fireproof wadding or carbon-carbon composites, and high performance brakes (for aircrafts, racing cars and high-speed trains).

The so-oxidized PAN fibre is then subjected to a subsequent process of carbonization, generally conducted in an inert atmosphere, during which occurs the removal of the atoms other than to carbon structure with the development of the final graphitic structure. The carbonization process generally takes place in two stages: a first stage at a low temperature (350-950° C., 400-900° C. in current practice) and a second high temperature stage (1000-1800° C., 1000-1450° C. in current practice).

During all phases of the process of carbonization, HCN, NH3 e N2 are thus released, and also CO, CO2 and H2O can be released, depending on the amount of O2 bound by the PAN fibre during the oxidation treatment in air. After treatment at more than 1000° C., the PAN fibre has been transformed into a carbon fibre containing about 95% carbon and 5% nitrogen.

During the carbonization process, the fibre undergoes a transverse shrinkage, which results in a reduction of the diameter due to the loss of about 50% of its initial weight; instead, the corresponding longitudinal shrinkage is almost completely mechanically counteracted, resulting in the development of a greater molecular orientation that contributes to the increase in the final mechanical properties of the carbon fibre.

Mechanically, to perform both the oxidation step and the carbonization step, large ovens line are used. Typically, the oxidation takes place in several successive stations with increasing temperature, in which the precursor fibres are advanced by means of a series of rolls (pass-back rolls) that move them along horizontal forward and return paths, keeping them in tension.

In the carbonization furnaces, the temperature of subsequent stations are sequential, typically only applied to a tau portion of precursor fibre stretched between a single inlet roller and an output roller.

Therefore, each roller is supported at its ends and, if necessary, set in rotation by appropriate motors.

Downstream of the carbonization, the lines typically have a succession of "finishing" stations, in which the carbon fibre undergoes a series of chemical or thermal treatments to prepare it for use.

By way of example, these finishing stations include one or more of the following:

Electrolytic bath,
Drying/electrolyte removal station,
Sizing station;
Resin drying station.

Note that, in common industrial plants, the feed rollers have large lengths, longer than 3 meters, resulting in considerable problems in alignment and evaluation of the bending during operation, the latter aspect being critical in order to maintain the exact position of the fibre bundles during their advancement, without any overlap or contact therebetween.

In fact, the fibres are organized in individual tows, each consists of 1000 to 400,000 filaments, more currently in the sizes 3K, 12K, 24K and 50K (in which K refers to a thousand of filaments). The overlapping of the tows results in misalignments inside ovens, which can create different issues of thermal and mechanical nature.

Moreover, during the system operation, especially in the oxidation furnace, the rollers in question and their support structures are often subject to major variations in temperature and tension of the fibres, which involve important variations in their curvature and in their deformation under load, as well as movements by thermal expansion of both of the rollers and the support structures.

In the known art, to overcome such problems, the rollers are rotatably constrained to suitable supports at their ends, in which the supports are provided with a ball joint, a roller steerable bearing, or the like, in order to allow a "tracking" of the deformation without impairing the free rotation of the roller, i.e. without the deformation of the same results in the creation of tensions and stresses, leading to their damage.

However, also in consideration of the length of the rollers, this is not sufficient to ensure flatness in the lying plane of the fibres, mainly due to the variation of temperature of the support structures and of the rollers, which has an effect hardly predictable in the design phase (especially in the oxidation furnace, in which the temperature is variable).

For this reason, in the known art the supports are removably connected to the frame of the station (or oven), which in turn is provided with uprights or crosspieces provided with a plurality of receiving seats for the support (or the supports) arranged in succession, so as to allow a variation of positioning of supports of each roller according to the deformation thereof.

Disadvantageously, this method suffers from numerous drawbacks.

Primarily, the need of removing the support to change its position comprises the removal of the roller and the stop of the line, the latter operation having to be repeated for each roller of the line at different times, since the adjustment of the position/inclination of a roller clearly affects the next roller.

Consequently, it appears clear that the adjustment operation of the rollers is expensive, both in terms of time and material, since for the adjustment of each roller is required to advance the test fibre, which therefore will be eventually discarded/wasted.

Furthermore, the use of a succession of holes, and therefore different points, for positioning the support clearly makes impossible a real optimization of the position of the same, the operator having to "make do" to position the support at the closest point to the optimum position.

Moreover, the difficulty of obtaining a complete flatness in the roller leads to the risk of "fall" of the fibre therefrom, which tends to wrap around the end coupled to the bearing creating blocks and blocking the line.

The object of the present invention is therefore to overcome the drawbacks of the prior art above mentioned.

In particular, object of the present invention is to provide a support element for a feed roller for a fibre material having a simple realization and that is easily adjustable in the line.

Furthermore, object of the present invention is to provide a support element, which increases the reliability of the oven and of the line.

Moreover, a further object of the present invention is to provide a highly accurate feeding member for a fibre material and which has reduced setting times.

Still, a further object of the present invention is to provide an oxidation or carbonization furnace for the production of carbon fibres with a reduced production of waste and a quick setting.

Said objects are achieved by a support element having features as disclosed herein, by an advancement member having features as disclosed herein, and, by a carbonization line for the production of carbon fibres having features as disclosed herein.

More precisely, the support element of the present invention comprises a base provided with means for attachment to a structure or frame of the line and a support ring coupled with said base and having at least one passing-through opening for receiving one end of said feed roller.

According to a first aspect of the present invention, the support element comprises adjustment means operatively interposed between said base and said ring, and configured to move the position of the ring with respect to the base along at least one adjustment direction, transverse to a central axis of said opening, in order to adjust the position of the ring as a function of the deformations of the roller.

Advantageously, in this way the personnel can evaluate the position of the roller during the operation of the line, directly acting on the adjustment means to vary the position without interrupting the advancement of the fibre.

Preferably, the adjustment means comprise first and second adjustment means configured to move the position of the ring with respect to the base along at least a first and a second adjustment direction, substantially orthogonal to each other and both transverse to said central axis of the opening, in order to adjust the position of the ring as a function of the deformations of the roller.

Advantageously, in this way it is very simple and immediate to obtain a precise positioning of the roller in all directions that are affected by its deformation.

In fact, the adjustment means (preferably of the type with opposite right-handed/left-handed screw threads) are accessible mechanically and/or electronically from outside the support element, in such a way as to allow a setting on line, i.e. without interrupting the line and the position of the ring.

According to a further aspect of the present invention, the element comprises a protection septum integrally constrained to the ring, on the top of the upper opening (with reference to a condition of use), and projecting from the ring itself along the central axis to protect the end of the roller to prevent possible windings of fibres of material.

Advantageously, the presence of the protection (preferably tubular in shape) prevents the falling fibre filaments of the central portion from winding around the end of the same, creating not only an interruption of the production, but in certain cases a significant damage to the plant.

Therefore, the advancement member according to the present invention comprises a support structure provided with at least a pair of uprights and/or a cross member, at least one feed roller extending along its own main direction, substantially horizontal, and a pair of support elements each rotatably associated with one end of said roller and having the base constrained to a upright or to the cross member of said structure.

Preferably, the member includes a plurality of rollers arranged in cascade and a corresponding plurality of support elements.

Similarly, the oxidation furnace is arranged in use along the carbonization line for the production of carbon fibres, in a "preliminary" section, and includes a plurality of advancement members arranged in succession along a direction of the main line of development, preferably horizontal, and heating means (or furnaces) interposed between two successive members.

Preferably, in any case, each station of the line, whether it be an oxidation furnace, a carbonization line or a finishing station, a plurality of rollers arranged in succession, wherein at least one of said rollers is rotatably connected to two support elements according to the present invention, in order to vary its position (along at least one direction), allowing to adjust, or adapt, the positioning and/or tensioning of the fibres as a function of the boundary conditions (type of fibre, temperature, rigidity of the structure).

These and further features and advantages will become more apparent from the following exemplary, and therefore not limiting, description of a preferred, and therefore not exclusive, embodiment of a support element for a feed roller, a advancement member for a fibre material, and an oxidation or carbonization line to produce carbon fibres, as illustrated in the accompanying figures, in which.

With reference to the attached figures, the number 1 indicates a support element for a feed roller 106, 114 of a fibre material "F" in an oxidation or carbonization line according to the present invention.

The oxidation or carbonization line is part of a plant for the production of carbon fibre, or a system comprising a first line, i.e. the oxidation line, and a second line, subsequent to the first, i.e. the carbonization line.

The oxidation line comprises one or more ovens 100, 104 (or stations), each provided with a plurality of advancement members 102 for the fibre material "F" (precursor) and heating means 103 configured to obtain a predetermined temperature between these advancement members 102. More precisely, each furnace 100, 104 has a plurality of stations.

Each advancement member 102, 113 thus includes a support structure 101 (or frame) having a pair of uprights 101a or a cross member 101b, which are rotatably coupled to feed rollers 106, 114.

More precisely, each furnace or station of the oxidation line 100 comprises at least one pair of feed elements 102 facing each other and each comprising a plurality of feed rollers 106 arranged in cascade, preferably along a substantially vertical direction; note that each roller 106 of a advancement member 102 is functionally associated with a corresponding roller of the following member 102, defining both the "returns" for the fibre material "F", which determine the reverse movement towards a next roller 106.

Therefore, each furnace or station is configured for moving the fibre material "F" in continuous sections of forward and return travel, so as to retain the material inside the oven in continuous feeding, in which the number of "sections" depends on the number of rollers 106.

In some embodiments, the rollers 106 of the member are totally or partially motorized, to allow a correct traction of the material and to determine a feeding at a controlled speed.

Note that the oxidation furnace 100 does not has seals, as the heating, at increasing temperature in the various stations, is performed in the air.

Figure 2A:
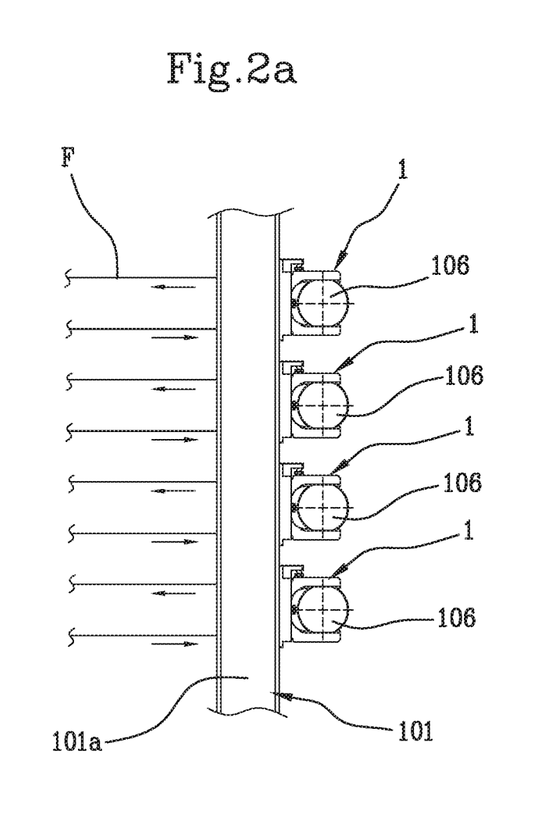
FIGS. 2a and 2b show two alternative embodiments of an advancement member for a fibre material according to the present invention.

Note that, in a first embodiment (FIG. 2a), called "compression" embodiment, each oven 100 has two feed elements 102 facing and spaced apart from each other, wherein the distance between the central axes of the rollers 106 of an member and the central axes of the corresponding rollers 106 of the other member is greater than the distance between each upright of an member 102 and the corresponding upright of the other.

Alternatively, in a second embodiment (FIG. 2b), called "traction" embodiment, the distance between the central axes of the rollers 106 of an member and the central axes of the corresponding rollers 106 of the other member is less than the distance between each upright of an member 102 and the corresponding upright of the other.

Figure 2B:
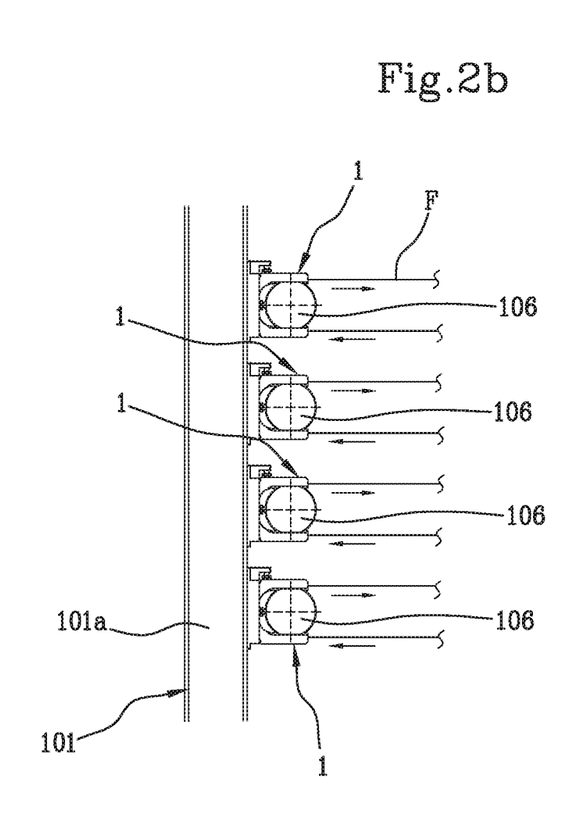
Figure 3:
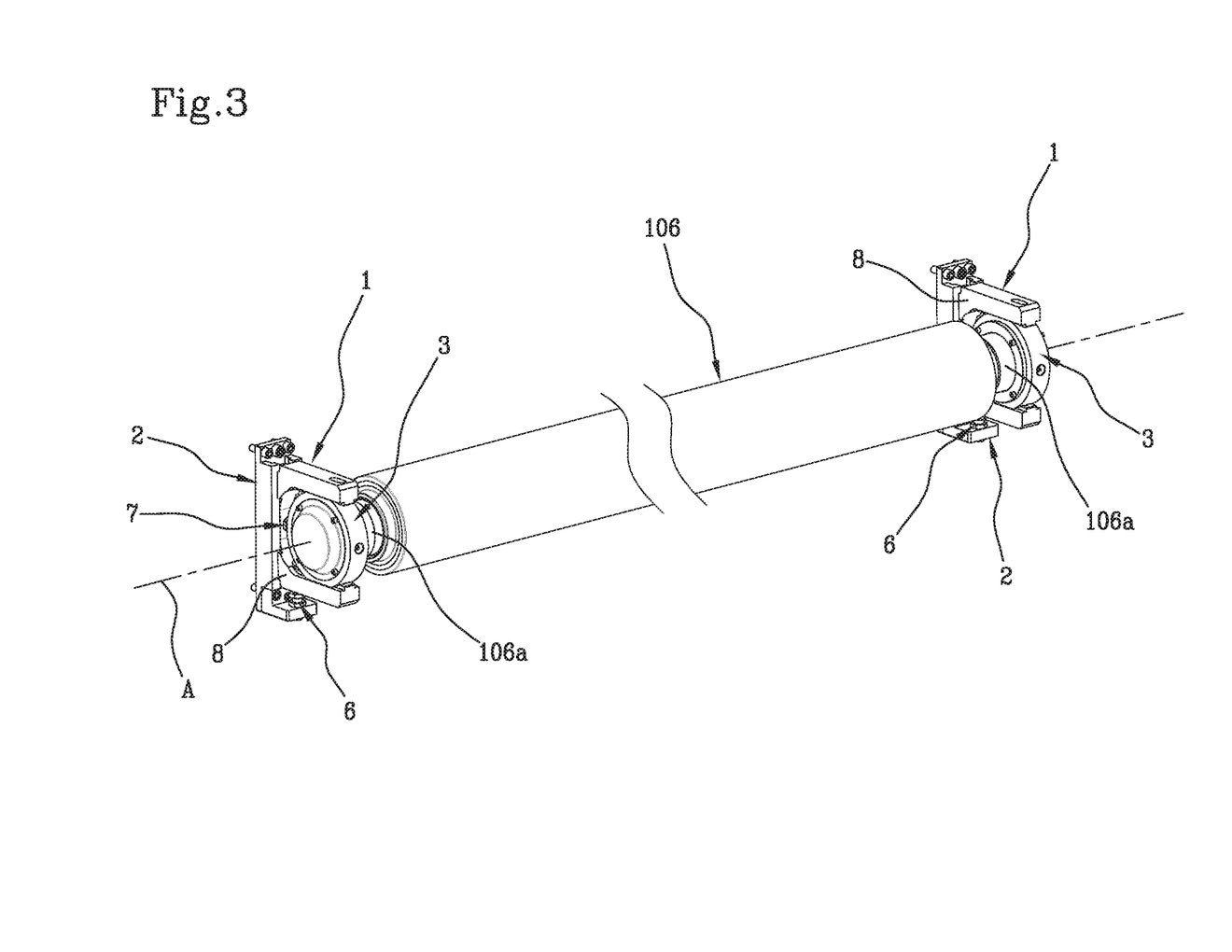
FIG. 3 shows a perspective view of a feed roller supported by two support elements according to the present invention.
Figure 4:
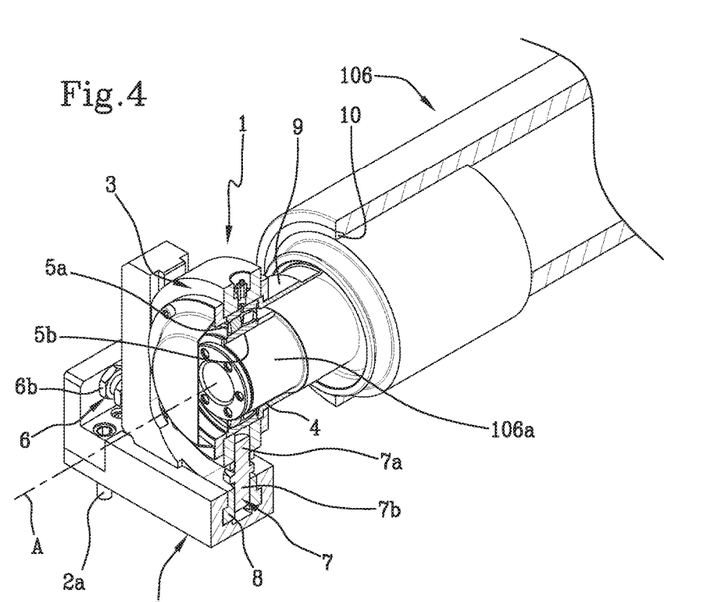
FIG. 4 shows a detail of a feed roller supported by a support element according to the present invention, with some parts removed in order to highlight others.
Figure 5:
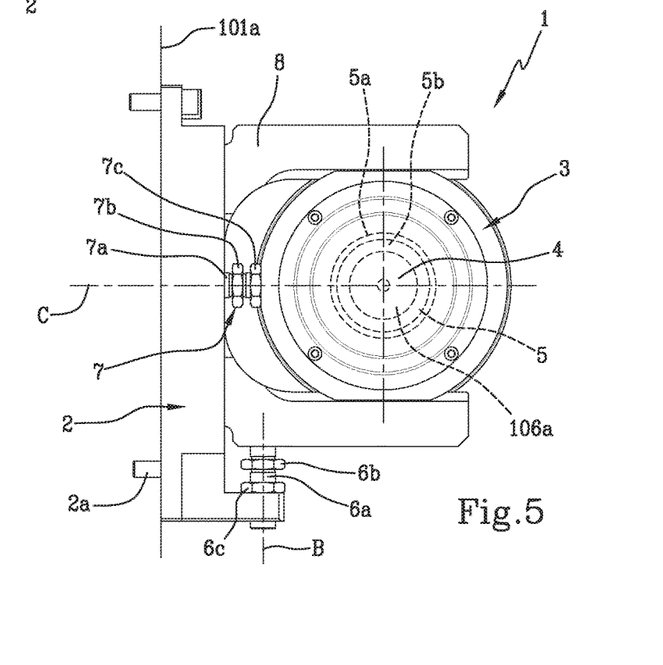
FIGS. 5-7 show perspective side views in longitudinal section of the support element according to the present invention, in a first embodiment.
Figure 6:
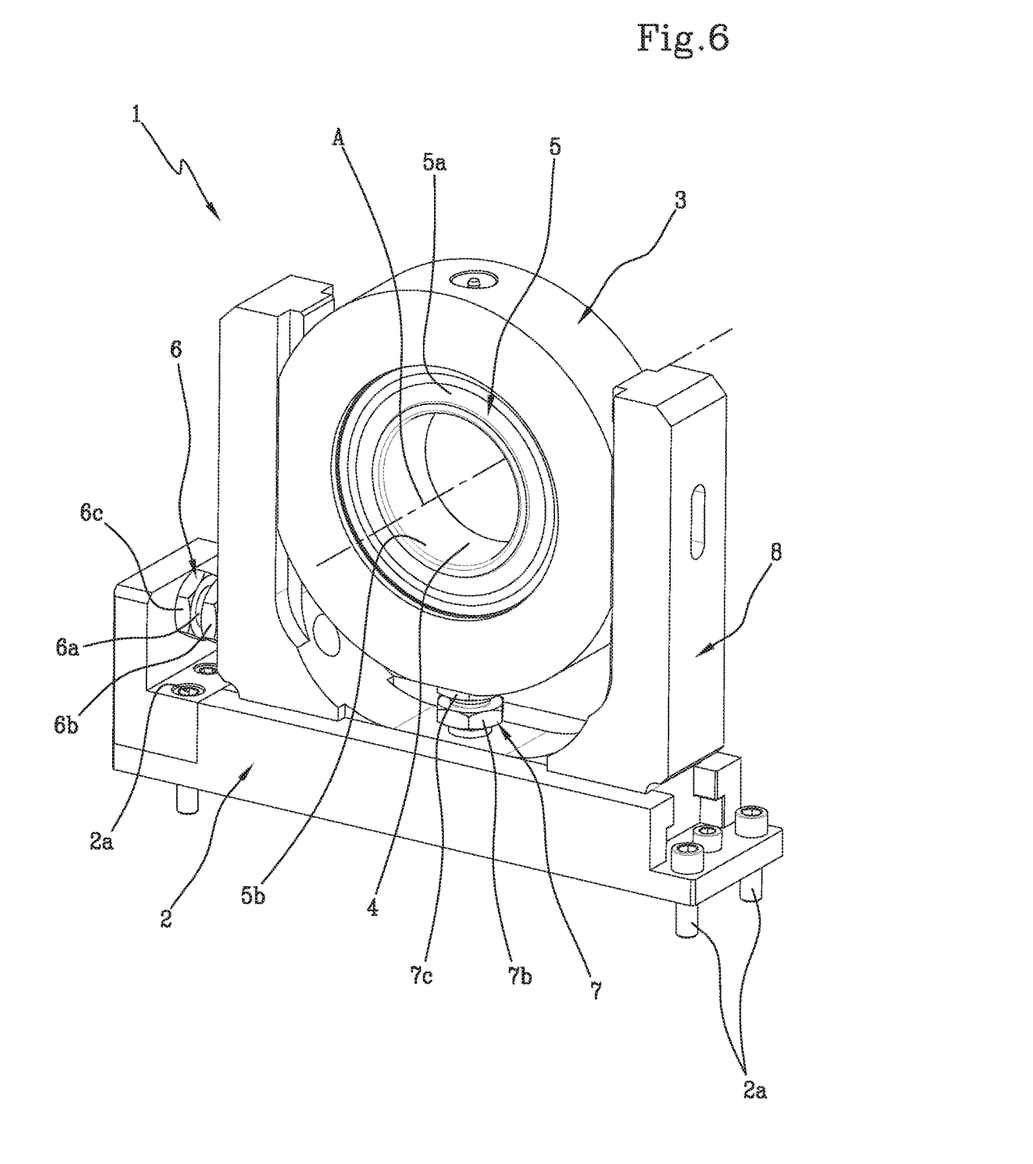
Figure 7:
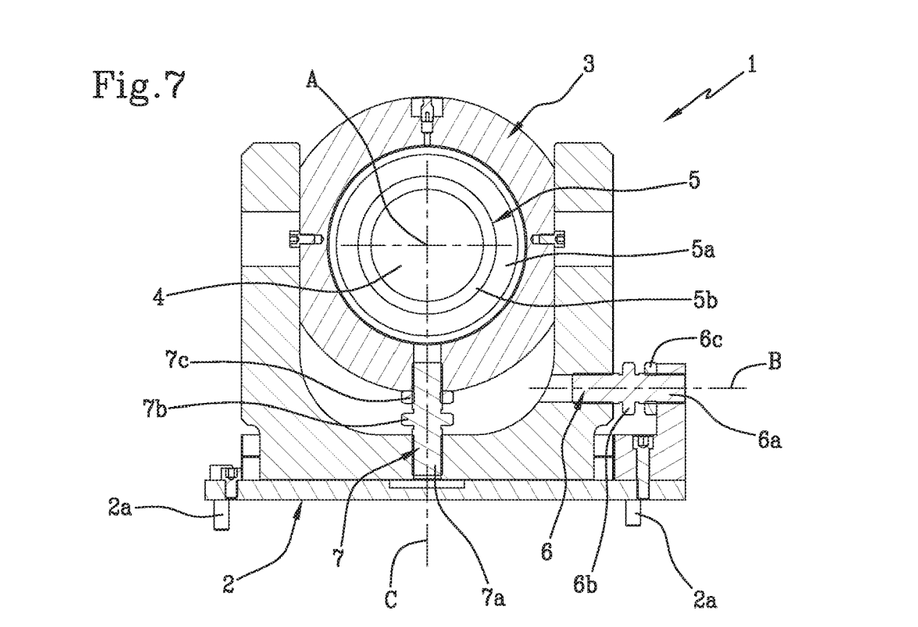

Advantageously, this second embodiment allows to obtain a better operability of the line, since it ensures the lateral access to the fibre material "F", which is difficult for the presence of the uprights (or in any case of the support structure) with the first option.

On the contrary, the carbonization furnace 104 is a sealingly structure, because the desired reaction cannot take place in an oxygen-containing atmosphere (typically used gases are nitrogen or argon)

More precisely, the carbonization furnace can comprise one or more furnaces 104a arranged in series.

In the illustrated embodiment, for example, the carbonization furnace 104 includes three furnaces 104a arranged in succession and operating at respective operative temperatures, in which each temperature of a furnace is greater compared to the previous.

Between each furnace and the next one at least one advancement member 113 is arranged, comprising a plurality of feed rollers defining a feeding and tensioning path of the fibre "F".

In particular, each advancement member 113 of the carbonization furnace 104 determines the release portion of the fibre "F", which is directly associated with the input portion 104a of the same in the furnace (that is very important given the limited size of the access mouth of the furnace itself).

Downstream of the carbonization furnace 104, the line preferably includes a plurality of finishing stations 107, which may vary in type, number and/or specifications depending on the type of fibre treated.

The finishing stations 107 may include a surface treatment station 108 and/or a tank for electrolytic (or galvanic) treatment in which the fibre is dipped.

In this station a plurality of rollers 106 are provided, in particular at least one input roller 106 and one release roller.

Moreover, such finishing stations 107 may include a washing station 109, which is also provided with at least a tank 109a and, from a structural point of view, preferably similar to the surface treatment station 108. In this station, the "bath" contained in the tank 109a allows the removal of the electrolyte paired in the previous phase.

Another finishing station 107 preferably arranged along the line is the contact drying station 110.

This station 110 has also many feed rollers, some of which are heated, while others have a merely transport function.

In the illustrated embodiments, the line also includes a sizing station 111 or for coupling a resin, again provided with a tank 111a and one more feed rollers of the fibre material.

Following the sizing station 111, the line preferably comprises (in particular the finishing stations 107 comprise) a drying station 112, in which at least four rollers 106, two by two, so that the fibre travels on a "square wave" path having a significant height (>5 m), in which it is invested by a flow of hot air. Therefore, the (contactless) drying station 112 comprises convective heating means 112a.

Note that, on such large lengths, the positioning of the rollers (upper or, preferably, lower rollers) is critical for the tensioning of the fibre "F".

Note that each of the feed rollers 106, 114, in all the lines, ovens and stations described above is rotatably connected to the respective frame 101 (upright 101a or cross member 101b) by means of a pair of support elements 1 each associated with one end 106a of the roller 106.

Each support element 1 has a base 2 provided with means 2a for attachment to the structure or frame 101 of the furnace 100, preferably with an upright 101a or cross member of the advancement member 102, 113.

The connecting means 2a are preferably passing-through holes (threaded or not threaded) able to be faced to respective seats made in the upright 101a or cross member 101b of the advancement member 102, 113, and fastened to them by means of threaded fasteners or other types of connection, preferably reversible.

In addition, the element 1 comprises a support ring 3 coupled with the base 2 and having at least one passing-through opening 4 for receiving one end 106a of said feed roller 106, 114.

Therefore, the opening 4 extends along a central axis "A" that is substantially parallel (at least in the undeformed stage) to an extending axis of the feed roller 106, 114.

Preferably, the support element 1 comprises a bearing 5 inserted into the opening 4 and coupled with the end 106a of the roller 106, 114.

Note that the bearing 5 includes an outer tubular body 5a (defining at least in part the ring 3) and an inner rotatable body 5b, which can be coupled (coupled in use) to the end 106a of the roller 106, 114 and freely rotatably in the outer tubular body 5a.

The rotatable body 5b thus has a coupleable cavity, for an axial insertion, with the respective ends 106a of the feed roller 106, 114. Therefore, the rotatable body 5b is keyed on the end 106a of the roller 106, 114.

In certain embodiments, the bearing 5 comprises (or is defined by) a ball joint configured to vary its angle, i.e. the position of the inner rotatable body 5b with respect to the outer tubular body 5a as a function of the deformation or inclination of the roller 106, 114.

Advantageously, in this way the roller 106, 114 can rotate freely and without the creation of internal tensions, even in case of deformations, which lead to mate it with the support element 1 (in particular with the ring 3) in a not perfectly orthogonal way.

According to a first aspect of the present invention, the support element comprises adjustment means 6, 7 operatively interposed between the base 2 and the ring 3.

Therefore, the base 2 and the ring 3 are two separate bodies that are removably connected to each other, in other words connected so as to be able to vary their relative position to one another.

Therefore, preferably, the support element 1 comprises at least one carrier 8 connected to the ring 3 and slidably associated with the base 2 to move, with respect to it, along said adjustment direction "B", "C".

The base 2 thus has a guide 2a (in the form of a groove or a rail) slidingly constrained to the carrier 8 to allow its movement along the adjustment direction "B", "C".

The adjustment means 6, 7 are configured to precisely move the position of the ring 3 with respect to the base 2 along at least one adjustment direction "B", "C", transverse to the central axis "A" of the opening 4, in order to adjust the position of the ring 3 as a function of the deformation of the roller 106, 114.

More precisely, therefore, the adjustment means 6, 7 are operatively interposed at least between the base 2 and the carrier 8.

Note that these adjustment means 6, 7 are accessible mechanically and/or electronically from the outside of the element 1 in order to allow an in line adjustment of the position of the ring 3.

Advantageously, due to the subdivision of the element 1 in at least two distinct portions, which are removably connected to each other, and the action of the adjustment means 6, 7, the operator can evaluate the position and the orientation of the roller 106, 114, being able to act directly on the support element 1 to adjust it without interrupting the advancement of the fibre material "F".

This is clearly significantly advantageous, both in terms of time (one day for the adjustment of the line against at least one week with the prior art systems) and in terms of "wasted" material (due to the ability to act directly in line).

Therefore, in this way the operator can simply and quickly optimize the position of the roller 106, 114.

Figure 1A:
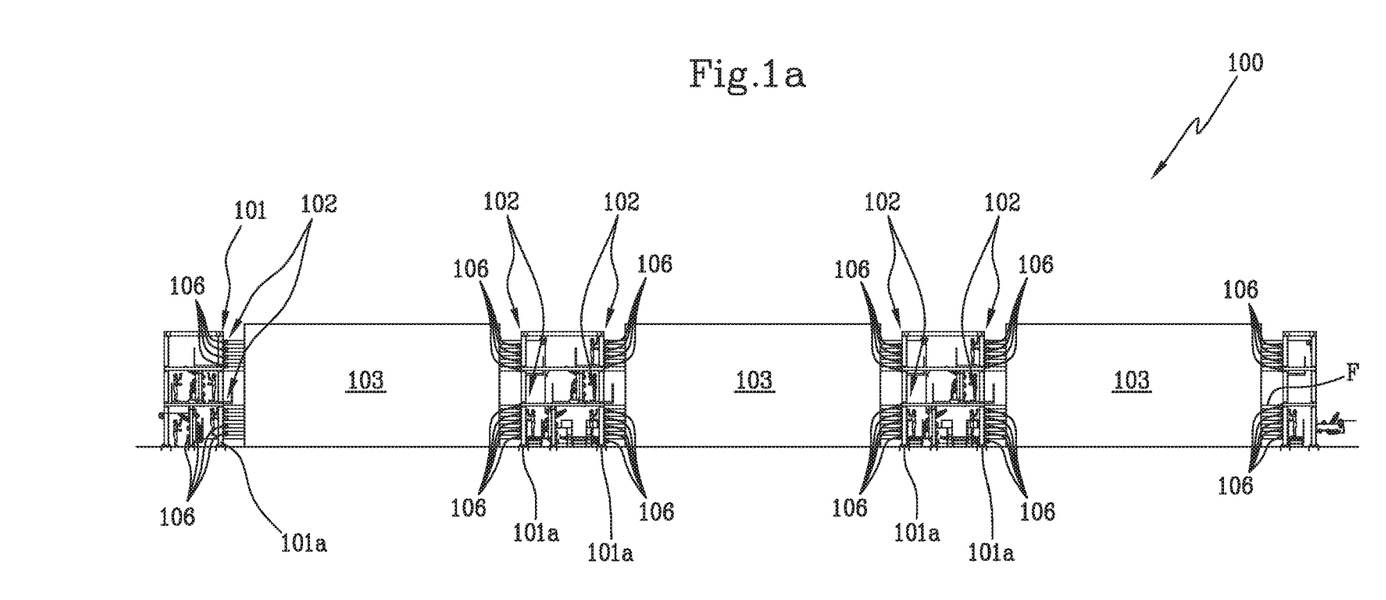
FIGS. 1a, 1b, 1c show schematic side views of a plant for the production of carbon fibre comprising an oxidation line, a carbonization line, and a plurality of finishing stations comprising a plurality of advancement members according to the present invention.

In the oxidation furnace 100 (FIG. 1a), such a specific configuration of the elements 1 thus allows to adapt the height of the "support" point of the roller both as a function of the thermal deformation (of the roller 106 itself or of the structure 101) and of the imperfections in supporting the structure, which can be therefore perfectly managed.

In the carbonization furnaces (FIG. 1b), the support elements 1 according to the present invention are particularly useful at the end roller 114 of the advancement member 113, which faces the furnace 104a.

Figure 1B:
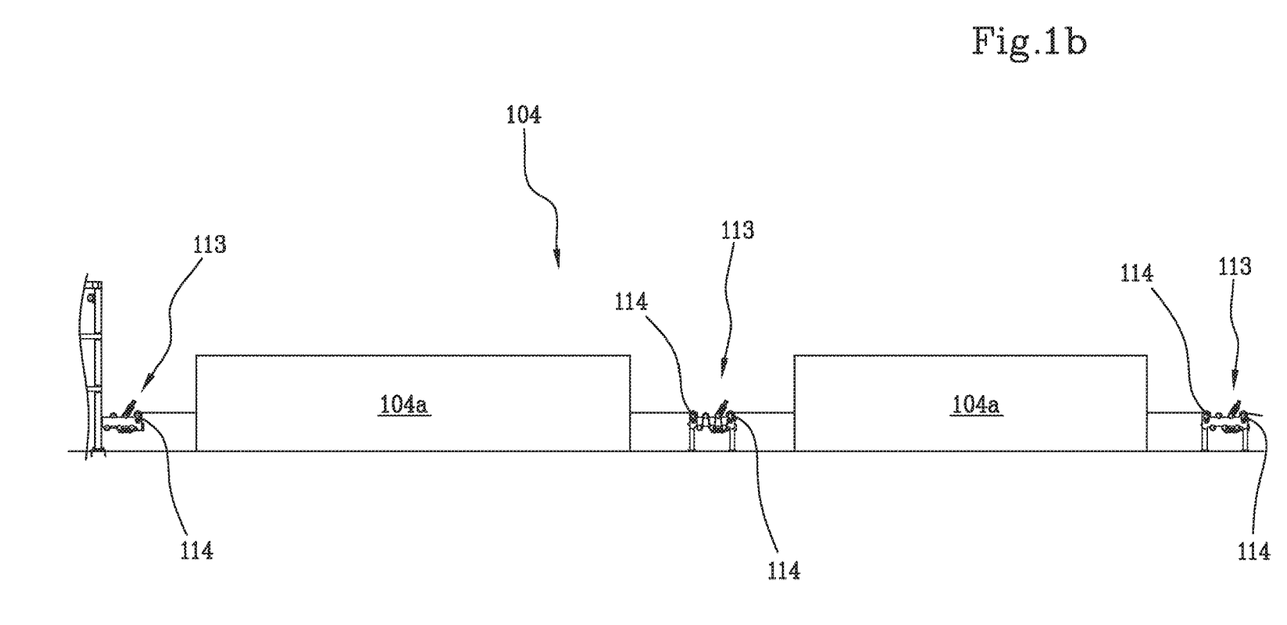
Figure 1C:
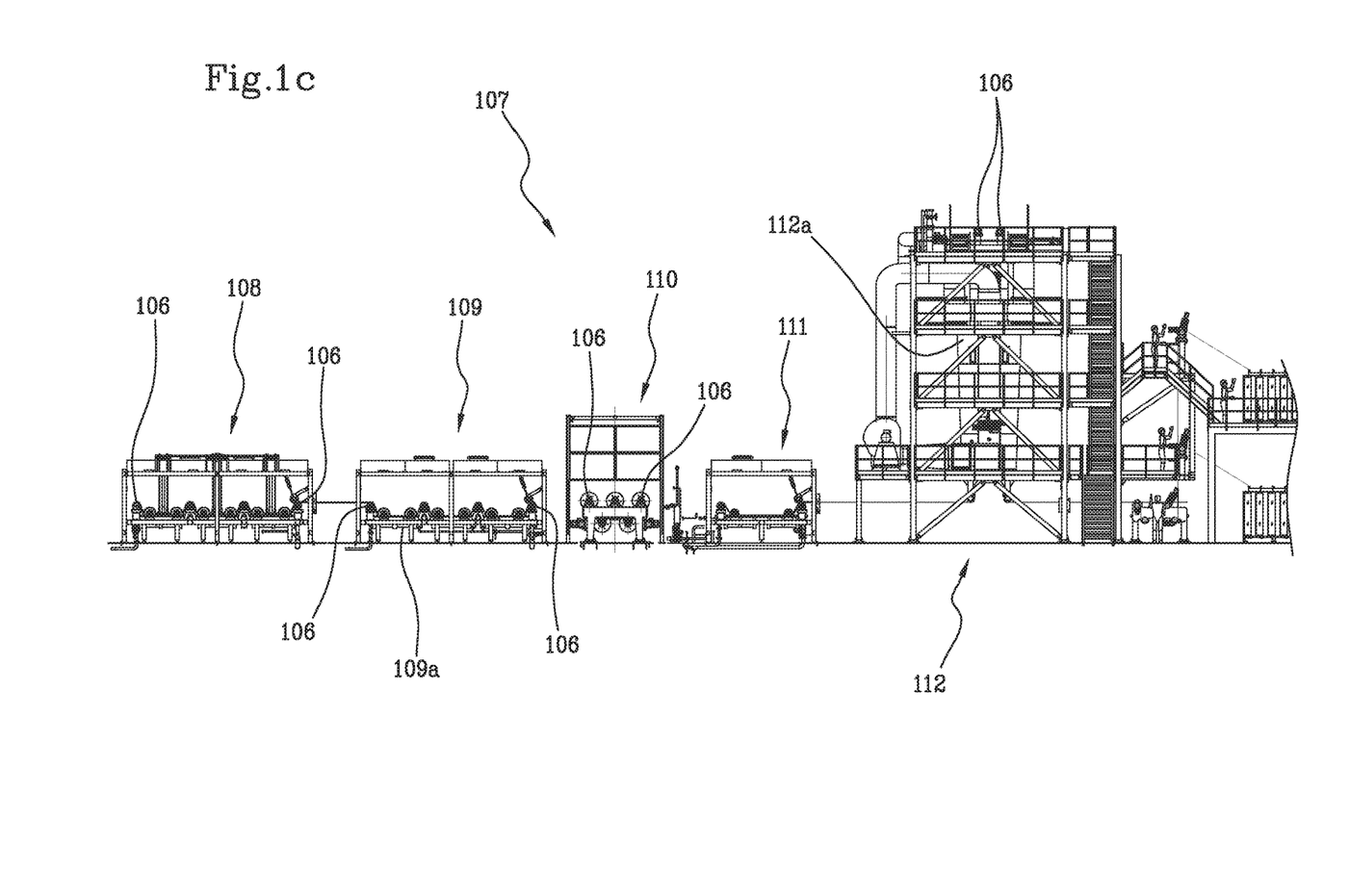

Advantageously, in fact, the presence of a support element 1 that allows the vertical movement (along a single direction is sufficient) of the roller 114 allows a precise adjustment of the fibre material in the input portion 104a in the furnace.

However, similar considerations can be made for all finishing stations 107, in which the ability to adjust the bearing/roller position allows to compensate for deformations due to machining, misalignment due to non-planarity of the support plane or of the support structure (in particular, in the case it is not machined), or to vary the tension of the material as a function of the type of material and processing.

Figure 8:
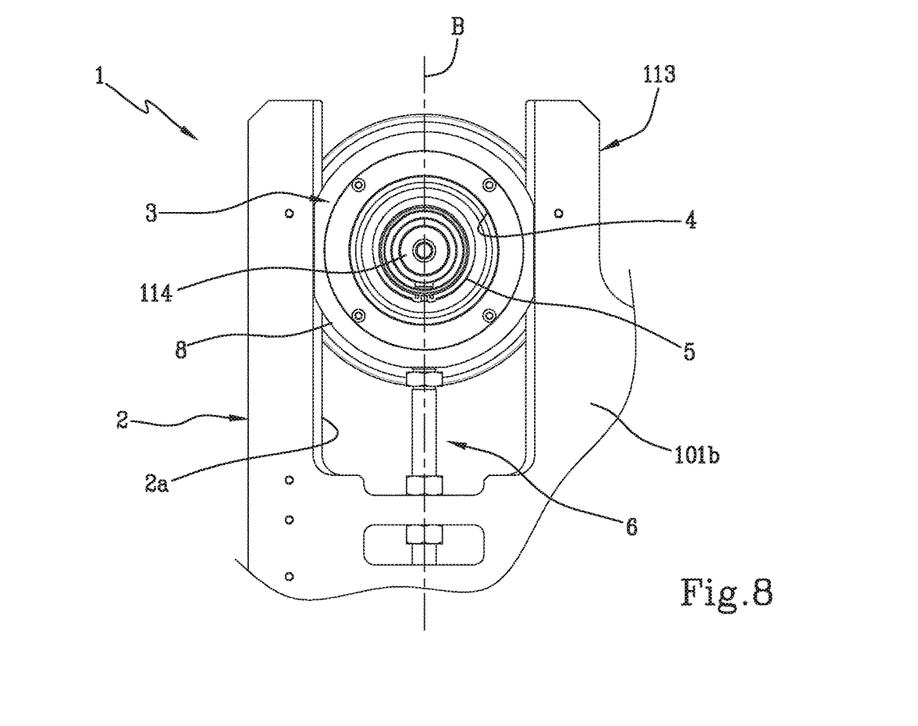
FIG. 8 shows a side view of the support element according to the present invention, in a second embodiment.

In this respect, it is noted that in FIG. 8 is illustrated an embodiment of such support element 1, preferably integrated in a frame 101 and provided with said vertical adjustment means 6.

Moreover, thanks to the support element 1 according to the present invention, it is only necessary to start the line (thus actuating the roller 106, 114) to allow the advancement of the fibre material "F", monitoring the inclination of the roller 106, 114 to vary the temperature (for example, viewing the transverse movement of the fibre) and actuating the adjustment means 6, 7 for varying the position of the support 1, all during the advancement of said fibre material "F" and without stopping the plant.

Preferably, in the embodiments shown in greater detail, the support element 1 comprises first 6 and second 7 adjustment means configured to move the position of the ring 3 with respect to the base 2 along at least a first "B" and a second adjustment direction "C", substantially orthogonal to each other and both transverse (preferably orthogonal) to the central axis "A" of the opening 4, in order to adjust the position of the ring 3 in all the plane parallel to the direction of advancement of the fibre material "F".

This is particularly advantageous in the oxidation furnace, in which the adjustment of the position of the rollers 106 may be required on at least two axes.

Preferably, therefore, the carrier 8 is slidably associated with the base 2 to move, with respect to it, along the first direction of adjustment "B" and the ring 3, in turn, is slidingly coupled to the carrier 8 to move, with respect to it, along the second direction of adjustment "C".

Therefore, the first adjustment means 6 are operatively interposed between the base 2 and the carrier 8, while the second adjustment means 7 are operatively interposed between said carrier 8 and the ring 3.

Preferably, the adjustment means 6, 7 are of the screw type.

More precisely, the adjustment means (first 6 and/or second 7 means) comprise at least a screw 6a, 7a extending along the respective first "B" or second direction of adjustment "C" and rotatably coupled (by means of a threaded coupling), respectively, with the base 2 and/or the ring 3.

The screw 6a, 7a is also pivotally coupled to the carrier 8.

In the illustrated embodiment, the adjustment means 6, 7 are operated manually; preferably, each screw 6a, 7a is integrally coupled with an actuation nut 6b, 7b, selectively usable by the operator for rotating the screw 6a, 7a (and therefore for moving the ring 3).

Alternatively, however, solutions in which the adjustment means are automated and/or of other nature (e.g., electric motors, linear actuators, spiral pairs, rack and pinion, or other types of known or unknown connections) are also comprised in the spirit of the present invention.

Preferably, moreover, the adjustment means 6, 7 are provided with at least one locking member 6c, 7c configured to constrain the position of the ring 3 with respect to the base 2, once identified, by the operator, as the optimal one.

In the illustrated embodiment, the locking member 6c, 7c is a lock-nut rotatably coupled with the screw 6a, 7a, which can be abutted against said ring 3 or said carrier 8 or said base 2 to fix the obtained position along the respective direction of adjustment "B", "C" by maneuvering the screw 6a, 7a.

Alternatively, in order to avoid a "weak" locking by the operator, in certain embodiments the locking of the position obtained along the "adjustment direction B", "C" is achieved by designing, in a suitable manner, the coupling between the screw 6a, 7a and the bodies concerned (base 2, carrier 8, ring 3).

More precisely, a little sliding, coarse thread is used, so that (given the acting loads), once the position is obtained, the same cannot be modified, except in the case of an appropriate and voluntary action by the operator.

According to a further aspect of the present invention, the support element comprises a protection septum 9 firmly constrained to the ring 3, above said opening 4 (at least in the condition of use) and projecting from the same along said central axis "A".

Advantageously, in this way the end 106a of the roller 106, 114 rotatably coupled to the ring 3 is protected by a fix element (septum 9), on which any material "F" that were to move laterally towards the end 106a itself could move the windings of the fibre material at the end itself.

Advantageously, in this way a current problem comprising considerable delays in the production and, sometimes, extensive damage to the structure is solved in a simple manner.

Preferably, the protection septum 9 comprises a tubular portion 10 at least partially wound around said opening 4 and projecting from the ring 3 along said central axis "A".

In the illustrated embodiment, the portion 10 is completely tubular in shape, coaxial to the opening 4, and completely surrounds the end 106a of the roller 106, 114.

The invention achieves the intended objects and provides important advantages.

In fact, the use of support elements divided into more parts removably connected to one another and whose relative position is adjustable in a substantially direct manner allows to overcome many drawbacks of the prior art, enabling the optimization of the setting step of the line from many points of view.

Furthermore, the preparation of a septum that protect and insulate the end portion of the (rotating) roller from the (translating) fibre material, prevents the windings thereof around the roller from creating blocks and damage to the structure.

The invention claimed is:

1. A carbonization line for production of carbon fibers, comprising:
a plurality of advancement members arranged in succession along a main direction of development of the carbonization line;
a heating system interposed between two successive advancement members of the plurality of advancement members,
wherein each of the two successive advancement members comprises:
a support structure including at least one chosen from an upright and a cross member;
a feed roller extending along an axial direction of extension, substantially horizontal, between first and second ends;
first and second support elements rotatably associated with the first and second ends, respectively, wherein each of the first and second support elements comprises:
a base attached to the at least one chosen from the upright and the cross member;
a support ring coupled with the base and including a passing-through opening for receiving one of the first and second ends;
an adjustment device operatively interposed between the base and the support ring, and configured to move a position of the support ring with respect to the base along at least one adjustment direction, transverse to a central axis of the opening, to adjust the position of the support ring as a function of deformations of at least one chosen from the feed roller, the structure and a support frame of the feed roller.

2. The carbonization line according to claim 1, wherein the adjustment device includes first and second adjustment devices configured to move the position of the support ring with respect to the base along a first adjustment direction and a second adjustment direction, substantially orthogonal to each other and both transverse to the central axis of the opening, to adjust the position of the support ring in a plane parallel to a direction of advancement of the fiber material.

3. The carbonization line according to claim 2, and further comprising a carrier connected to the support ring and slidably associated with the base to move, with respect to the base, along the first adjustment direction.

4. The carbonization line according to claim 3, wherein the support ring is slidably constrained to the carrier to move, with respect to the carrier, along the second adjustment direction.

5. The carbonization line according to claim 4, wherein the first adjustment device is operatively interposed between the base and the carrier, while the second adjustment device is operatively interposed between the carrier and the support ring.

6. The carbonization line according to claim 1, wherein the adjustment device is accessible by at least one chosen from mechanically and electronically from outside of the support element to allow an in line adjustment of the position of the support ring.

7. The carbonization line according to claim 1, wherein the adjustment device includes a screw extending respectively along the respective adjustment direction and rotatably coupled, respectively, with at least one chosen from the base and the support ring.

8. The carbonization line according to claim 1, wherein the adjustment device includes a locking body configured to constrain the position of the support ring with respect to the base.

9. The carbonization line according to claim 1, and further comprising a ball joint inserted in the opening, coupled with the one of the first and second ends, and configured to vary angle as a function of the deformation or inclination of the feed roller.

10. The carbonization line according to claim 1, and further comprising a protection septum constrained to the support ring, above the opening, and projecting from the support ring along the central axis to protect the one of the first and second ends and prevent windings of material fibers.

11. The carbonization line according to claim 10, wherein the protection septum comprises one at least partly tubular portion wound around the opening and projecting from the support ring along the central axis.

12. The carbonization line according to claim 1, and further comprising a plurality of the feed rollers arranged in columns with each other, other and a corresponding plurality of support elements.

13. The carbonization line according to claim 12, wherein at least two of the plurality of feed rollers are motorized.

14. A method for adjusting inclination of a feed roller for a fiber material, comprising
providing:
    a base attached to at least one chosen from a structure and a frame of the carbonization line;
    a support ring coupled with the base and including a passing-through opening for receiving and supporting one end of the feed roller;
    an adjustment device operatively interposed between the base and the support ring, and configured to move a position of the support ring with respect to the base along at least one adjustment direction, transverse to a central axis of the opening, to adjust the position of the support ring as a function of deformations of at least one chosen from the feed roller, the structure and a support frame of the feed roller;
    actuating the feed roller to allow advancement of the fiber material;
    monitoring the inclination of the feed roller when a temperature changes;
    actuating the adjustment device for varying the position of the support ring during the advancement of the fiber material.

* * * * *